US007668709B2

(12) United States Patent
Wall et al.

(10) Patent No.: US 7,668,709 B2
(45) Date of Patent: Feb. 23, 2010

(54) GLOBALIZATION COMPONENT

(76) Inventors: Theresa Wall, 3036 Throne St., Murfreesboro, TN (US) 37129; John J. Dodson, 122 Copperas Ct., Murfreesboro, TN (US) 37128; Andy Mark McInturff, 13033 Halls Hill Pike, Milton, TN (US) 37118

( * ) Notice: Subject to any disclaimer, the term of this patent is extended or adjusted under 35 U.S.C. 154(b) by 672 days.

(21) Appl. No.: 11/433,307

(22) Filed: May 11, 2006

(65) Prior Publication Data
US 2007/0265827 A1 Nov. 15, 2007

(51) Int. Cl.
*G06F 17/20* (2006.01)
(52) U.S. Cl. .................. 704/8; 704/3; 704/5; 717/101; 717/103
(58) Field of Classification Search .................. 704/1, 704/2, 3, 5, 7, 8, 9; 717/101, 103; 719/339
See application file for complete search history.

(56) References Cited

U.S. PATENT DOCUMENTS

| 7,552,452 B2 * | 6/2009 | McHugh et al. ............. 719/331 |
| 2004/0128146 A1 | 7/2004 | Williams et al. ................ 705/1 |

OTHER PUBLICATIONS

DEC Data Systems: "DEC Data Systems—DataWise Manual" May 6, 2006, XP002470188, p. 5-p. 6, p. 58-60, p. 129.
Don Landing et al.: "Sensor Data Analysis Framework Research Roadmap—Integrating Stream Processing and Persistent Data Retrieval", Feb. 2006, XP002470189, the whole document.
Harrison M: "EPC Information Service—Data Model and Queries" Internet Citation, Oct. 1, 2003, XP002355668, the whole document.
Gehrke J et al: "Sensor and Actuator networks—Query processing in sensor networks" IEEE Pervasive Computing, IEEE Service Center, Los Alamitos, CA, US, vol. 3, No. 1, Jan. 2004, pp. 46-55, XP0011108155, the whole document.
Bonnet P. et al: "Querying the Physical World" IEEE Personal Communications, IEEE Communications Society, US, vol. 7, No. 5, Oct. 2000, pp. 10-15, XP000966619, the whole document.
Ledlie J et al: "Provenance-Aware Sensor Data Storage" Data Engineering Workshops, 2005, 21ST International Conference on Tokyo, Japan 05-08 April 2005, Piscataway, NJ, USA, IEEE, Apr. 5, 2005, pp. 1189-1189, XP010924091, the whole document.

(Continued)

*Primary Examiner*—Huyen X. Vo (57) ABSTRACT

A globalization component including a base class NewResourceManager that provides a layer of abstraction from the Microsoft Resource Manager and a new WinForm class that inherits from the .NET Windows Form and utilizes NewResourceManager. The globalization component uses culture information and resource folder information from the registry to set a culture-specific resource folder and file. Decoupled assembly culture-specific resource files include all string resources in the target language and can be stored in any folder. New culture-specific resource files are easily generated without having to recompile the assembly or any satellite assemblies and without having to modify any configuration files. The NewWinForm class can also iterate through all controls on the form and if values are missing from an associated resource file, the resource manager will save the missing controls to a text file. Translators need only receive this text file to translate from one human language to another.

18 Claims, 5 Drawing Sheets

OTHER PUBLICATIONS

Kevin Chang et al: "SensorBase.org—A Centralized Repository to Slog Sensor Network Data" Center for Embedded Network Sensing. Papers. Paper 116, May 5, 2006, XP002470190, the whole document.
Written Opinion corresponding to co-pending International Patent Application Serial No. PCT/US2007/011247, European Patent Office, dated May 15, 2008, 12 pages.

International Search Report corresponding to co-pending International Patent Application Serial No. PCT/US2007/011247, European Patent Office, dated May 15, 2008, 8 pages.

* cited by examiner

GLOBALIZATION COMPONENT

FIELD OF THE INVENTION

This invention is directed generally to a globalization component for facilitating the translation of software applications into multiple human languages, and, more particularly, to a globalization class for facilitating the translation of software applications into multiple human languages in a monitoring system such as a power monitoring system.

BACKGROUND OF THE INVENTION

Many software programs are written with a view toward translating them into multiple human languages for multi-cultural distribution (a process known as globalization). One software development platform used for such purpose is the .NET Framework by Microsoft® that provides a large standard library from which software developers can develop assemblies, which are basically code libraries. In the Microsoft® Windows® environment, an assembly takes the form of a process assembly (EXE) or a library assembly (DLL). The code in an assembly is partially compiled into a Common Intermediate Language (CIL), which is then fully compiled into machine language at runtime by a Common Language Runtime (CLR) virtual machine (VM). The standard .NET framework libraries include, among other things, standard classes, a resource manager, and forms.

A challenge for software developers developing software destined for multiple countries is that all the resources (typically text strings) must be extracted from the .NET assembly (or other assembly, such as an Internet-based assembly) so that the strings can be translated into other languages. The .NET Framework includes a standard ResourceManager class that will extract resources from embedded resource files or from satellite assemblies. But a disadvantage to embedded resources is that they are "embedded" into the assembly, which must be compiled with all necessary culture-specific resource files for each target language. In short, each translation requires that the code be recompiled. Corrections to existing resources (such as a typographical error in a string) also undesirably require that the code be recompiled, a time-consuming and error-prone process.

Another undesirable solution is to use satellite assemblies, each compiled for a specific culture. However, changes to resources of a satellite assembly or the development of a new satellite assembly for a new culture would require that the code be recompiled and that one or more configuration files be shipped with the new or modified files. This is necessitated by the fact that recompiling any .NET assembly often introduces incompatibilities between other related assemblies that were not recompiled. Introducing configuration files allows the developer to eliminate any specific incompatibilities that arise; however, producing and deploying these configuration files is a complicated process and creates additional work for the developers. Additionally, for every control in every form in an assembly, the software developer must include additional code that detects the culture and extracts resources from the pre-programmed file locations. This process is very tedious, prone to error, and significantly increases code size.

Thus, a need exists for an improved apparatus and method. The present invention is directed to satisfying one or more of these needs and solving other problems.

SUMMARY OF THE INVENTION

In an embodiment of the present invention, a method of decoupling resource files from an assembly includes providing an assembly that is executable by a computer, the assembly including forms having associated resources, the forms being defined by a form class, the resources being managed by a resource manager class. The method further includes defining a resource manager class that obtains culture information indicating a human language of an operating system running on the computer, reads resource folder information from a registry external to the assembly, the resource folder information indicating a location of at least one resource file, and searches the resource folder for a culture-specific resource file having a filename based on the culture information. A computer readable storage medium may be encoded with instructions for directing a controller to perform any method according to any embodiment herein.

The method may further include defining a form class that for at least some controls on a form, requests from the resource manager class a resource associated with each of the at least some controls, and if the resource manager class returns an indication that the control or the associated resource does not exist, adds the name of the missing control and the name of its associated form to a file. The method may further include determining, from the resource manager class, whether the requested control exists in the resource file. The computer may be coupled to a monitoring system that monitors measurable quantities of a utility. The utility may be selected from the group consisting of water, air, gas, energy, steam, and weather. The monitoring system may be a power monitoring system.

The method may further include creating a new resource file having text strings in a different human language from the text strings in the at least one resource file; and reading automatically from the assembly the new resource file without recompiling the assembly to read the new resource file.

In some embodiments, the assembly is developed in accordance with the .NET framework. In other embodiments, the assembly is developed in accordance with an Internet-based framework. The form class from which the forms in the assembly are derived may inherit from the standard form class provided by the .NET framework. The resource manager class may create an instance of the standard resource manager provided by the .NET framework. The file may be a text file, and the method may further include converting the text file to a resource file. The operating system may be a Windows-based operating system. The resource file(s) may be stored in a folder or folders different from the folder in which the assembly is stored. A change to the resources may not require any recompiling of the assembly in accordance with some embodiments.

According to another embodiment of the present invention, a globalization method includes providing an assembly that is executable by a computer in a monitoring system (such as a power monitoring system) that monitors measurable quantities of a utility, the assembly being programmed in accordance with a .NET framework; defining a globalization resource manager class within the .NET framework; and defining a globalization form class within the .NET framework.

The globalization resource manager class creates an instance of a default resource manager in the .NET framework, reads, from a registry external to the assembly, resource folder information indicating the location of at least one resource file, identifies a culture of the operating system on which the assembly is running, the culture including a human language, and specifies a resource file having a name based on at least the culture and a location based on at least the resource folder information.

The globalization form class identifies at least some controls on a form having a name, determines whether each of the at least some controls includes a text component, if the control of the at least some controls includes a text component, for each such control, requests from the globalization resource manager class the value corresponding to text component associated with such control, and stores the name of the form and the name of such control in a text file when the globalization resource manager class returns no value responsive to the request by the form class. The globalization form class inherits from the default form in the .NET framework, and any form a user creates inherits from the globalization form class instead of the default .NET framework form class.

The method may further include creating a new resource file having text strings, for the at least some controls that include a text component, the text strings being in a different human language from the human language of the culture; and reading, from the assembly, the text strings in the new resource file without recompiling the assembly as a result of the new resource file. The method may further include storing the resource file in a folder different from the folder in which the assembly is stored or storing in the registry the folder location of the resource file. The method may further include translating the values corresponding to the text components associated with each of the at least some controls into a human language different from the human language of the culture without recompiling the assembly as a result of the translation.

According to another embodiment of the present invention, a method of developing an assembly includes developing an assembly displaying string resources in a first human language. The assembly is programmed from source code that includes a globalization resource manager class that obtains (a) culture information from the operating system on which the assembly is running and (b) the folder location of at least one resource file from a registry external to the assembly. The method further includes compiling the at least one resource file, which includes the string resources; automatically generating a list of controls in the at least one resource file for which there is no associated value in a second human language; providing to a translator the list of controls whose associated string resources are to be translated from the first human language to a second human language; and compiling a new resource file that includes string resources in the second human language, wherein the compiling is carried out without having to recompile the assembly as a result of the providing and without having to distribute any configuration files as a result of providing the new resource file.

Additional aspects of the invention will be apparent to those of ordinary skill in the art in view of the detailed description of various embodiments, which is made with reference to the drawings, a brief description of which is provided below.

BRIEF DESCRIPTION OF THE DRAWINGS

The invention may best be understood by reference to the following description taken in conjunction with the accompanying drawings, in which.

DETAILED DESCRIPTION OF THE ILLUSTRATED EMBODIMENTS

Although the invention will be described in connection with certain preferred embodiments, it will be understood that the invention is not limited to those particular embodiments. On the contrary, the invention is intended to include all alternatives, modifications and equivalent arrangements as may be included within the spirit and scope of the invention as defined by the appended claims.

An embodiment of the present invention provides for a globalization component that eliminates the need to recompile assemblies for multiple translations or for changes to resources. Only the resource text files need to be modified; no binary assembly code needs to be modified and no configuration files need be modified or distributed. According to an embodiment of the present invention, a new class (hereafter called NewResourceManager) provides a layer of abstraction from the standard Microsoft® Resource Manager, which extracts resources from embedded resource files or satellite assemblies. The NewResourceManager class specifies the locations of the resource files based on culture information, allowing the same binary to work across operating systems in different human languages. Only the resource files would differ depending upon the human language (e.g., English, French, Spanish) of the operating system. The preferred development environment for the globalization component is Microsoft® Visual Studio®, though it should be understood that any suitable development environment may be utilized to develop Windows®, Mac OS®, or Internet-based assemblies. Advantages of the present invention include simplifying code development, reducing the amount of code, which reduces the frequency of errors and bugs, facilitating the globalization of code into multiple human languages, and providing a debugging tool for quickly identifying missing or invalid string resources. As applied to a monitoring system, such as a power monitoring system, the advantages become paramount because developing software for such systems is very complex involving a multitude of software modules, mining and analysis of huge quantities of data, and cross-regional database management.

Figure 1:
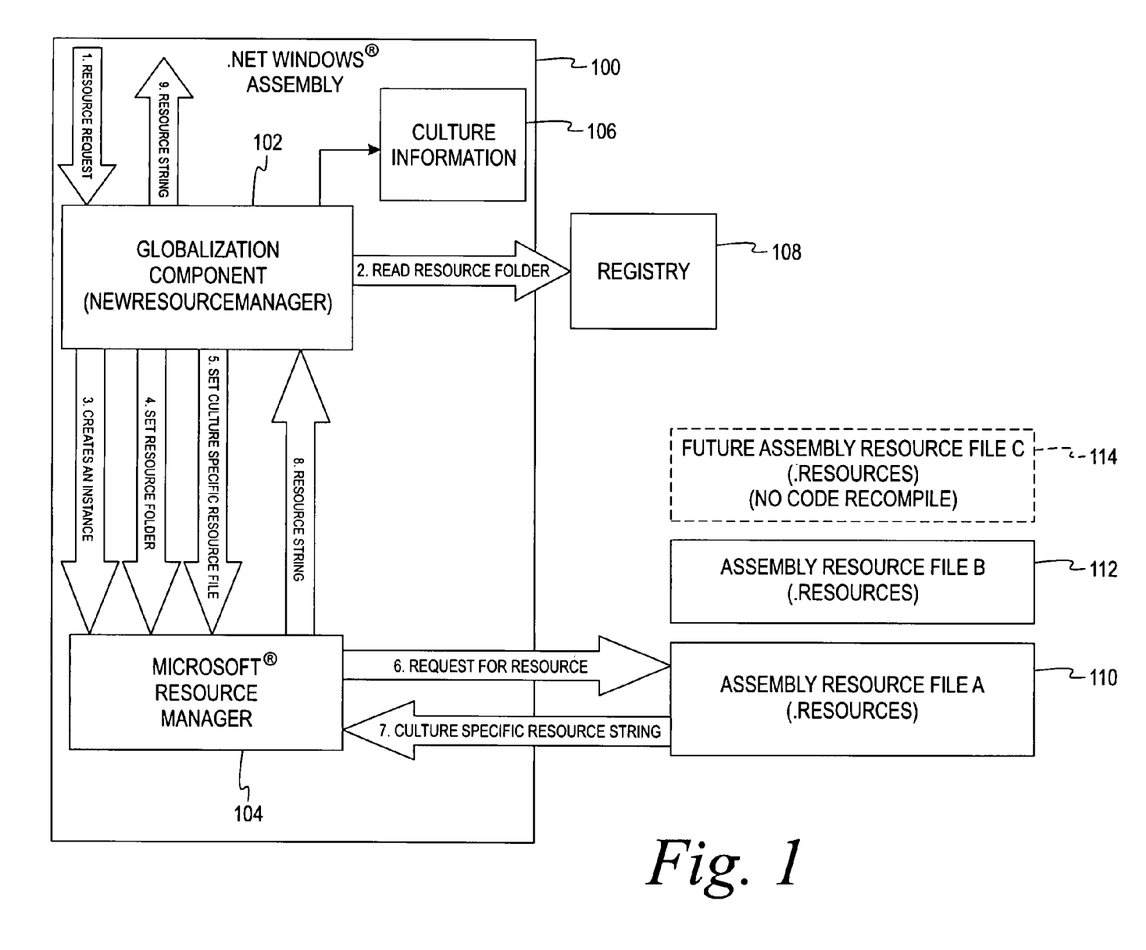
FIG. 1 is a functional block diagram of a system including a new resource class abstracted from the default Microsoft® Resource Manager in accordance with an embodiment of the present invention.

Referring now to the drawings, and initially to FIG. 1, a .NET framework assembly 100 is shown, which includes a globalization component called NewResourceManager 102 that is abstracted from the default Microsoft® Resource Manager 104 provided in the standard .NET Framework. As used herein, an assembly may include one or more process and/or dynamically linked library assemblies. The assembly 100 further includes culture information 106 and reads resource folder information from a registry 108. Assembly Resource File A 110 and Assembly Resource File B 112 have been decoupled from the assembly 100. The resource files 110, 112 are generated from a resource text file using a resource generator, such as resgen.exe, such that the text strings are obfuscated. The culture information 106 includes a human language ID associated with the operating system on which the assembly 100 is running.

The resource files 110, 112 include resources (such as text strings) whose values are written in a particular human language. For example, Resource File A may include all the resources for an English-language operating system, and Resource File B may include all the resources for a French-language operating system. If it is desired to provide the assembly for use with a Spanish-language operating system, Resource File C 114 may be generated without having to recompile the assembly 100 to accommodate the new resource file 114. The translator would be provided with the resource text file corresponding to the Resource File A 110, and would translate all the text strings in that resource text file into the target human language (in this example, Spanish). Then, the resource text file C would be compiled into the Resource File C 114 using a resource generator such as resgen.exe. No recompiling of the assembly 100 would be necessary. When the assembly 100 is run on a Spanish-language operating system, the assembly 100 would automatically pull the resources from the Resource File C 114. When the same assembly 100 is run on a French-language operating system, the assembly 100 would automatically pull the resources from the Resource File B 112. Any number of additional resource files in different human languages can be developed without modifying any source code in the assembly 100 and without modifying or distributing any configuration files.

The assembly 100 requests a resource from the NewResourceManager class 102, which requests the resource folder location from the external registry 108. Because the NewResourceManager class 102 has knowledge of where the resource files are located, the software developer has the flexibility to store resource files in any folder. The NewResourceManager class 102 creates an instance of the .NET framework Resource Manager class 104 and sets the resource folder information read from the registry 108. The NewResourceManager class 102 sets the culture-specific resource file using the culture information 106. The Resource Manager 104 requests the resource from the Resource File A 110, which returns the culture-specific resource string corresponding to the requested resource to the Resource Manager 104. The target resource string is provided from the Resource Manager 104 to the NewResourceManager class 102, which returns it to the assembly 100.

Figure 2:
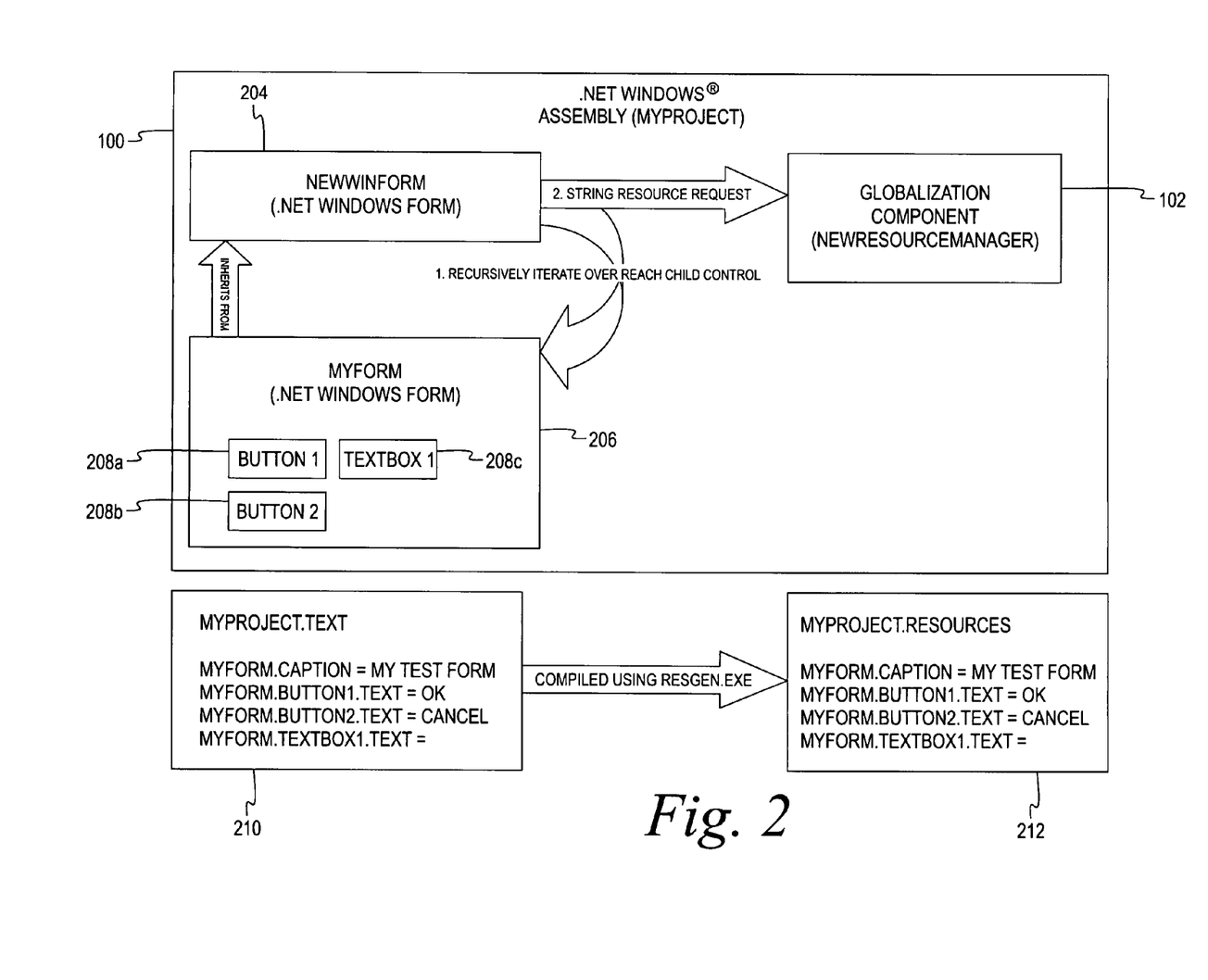
FIG. 2 is a functional block diagram of the system of FIG. 1 illustrating a form class MyForm that derives from the new globalization form class NewWinForm instead of the default .NET framework class.

In FIG. 2, the .NET assembly 100 is called MyProject and includes the NewResourceManager class 102 (globalization component), a .NET form class 204 called NewWinForm, and a form 206 called MyForm, which inherits from the base class NewWinForm 204 instead of the default form class provided in the .NET framework (all other child forms in the assembly 100 also inherit from the base class NewWinForm 204). The MyForm form 206 includes three controls or widgets, a button1 control 208a, a button2 control 208b, and a textbox1 control 208c. The NewWinForm base class 204 recursively iterates over each string-containing child control 208a, 208b, 208c on the MyForm form 206 and requests the string resources from the NewResourceManager class 202. The string resources for the controls 208a,b,c in the MyForm form 206 are stored in a text file called MyProject.text 210, which includes the name of each child control (myform.caption, myform.button1.text, and so forth) and its corresponding value ("OK," "Cancel," and so forth). The MyProject.text file 210 is compiled into a resource file MyProject.resources 212 by a resource generator, such as resgen.exe. The NewWinForm base class 204 automatically detects all controls in each child form, such as the MyForm form 206, and sets their respective text properties using the corresponding string resource in the MyProject.resources resource file 212.

Figure 3:
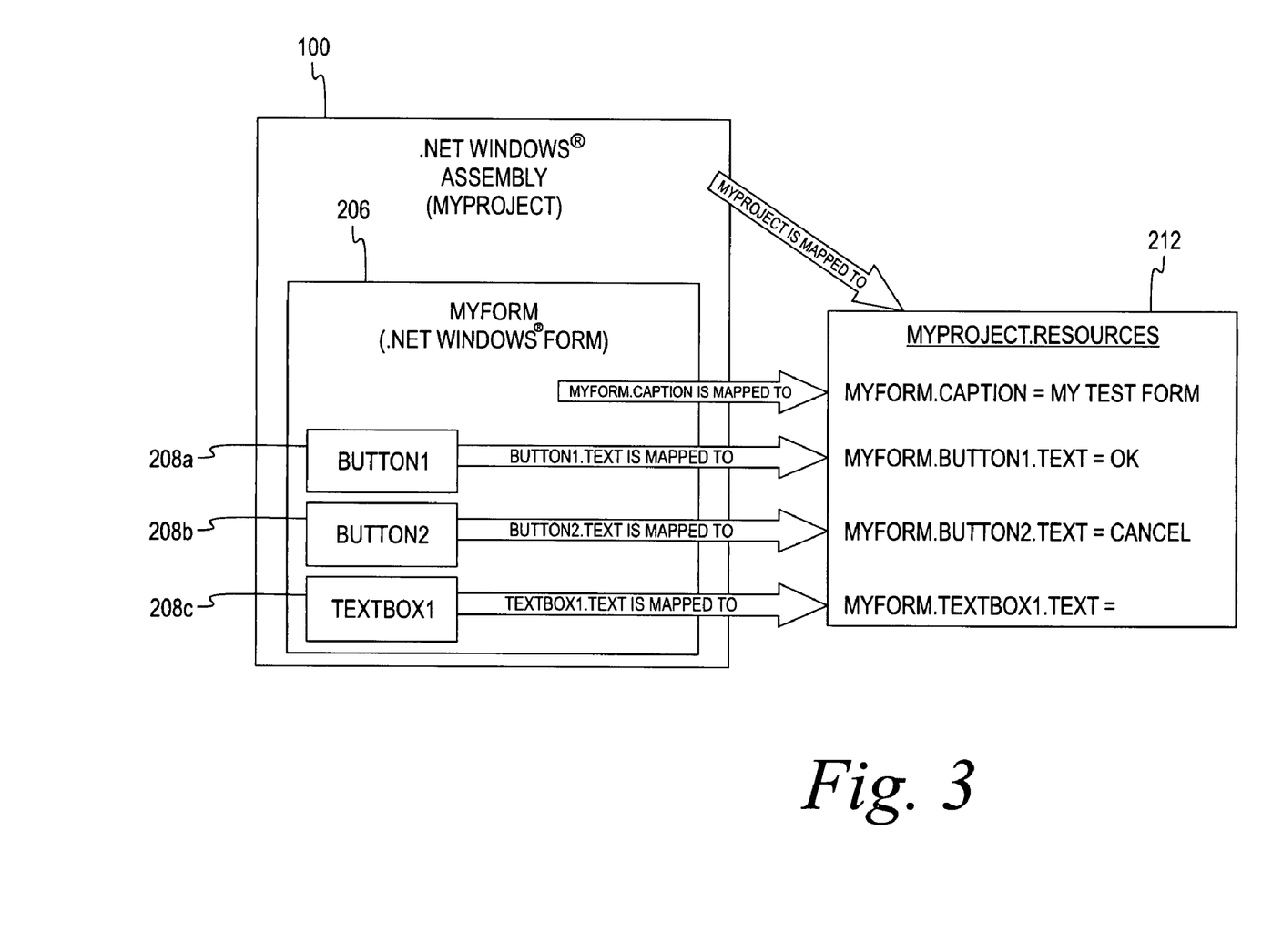
FIG. 3 is a functional block diagram of the system of FIG. 1 illustrating the mapping of various controls to a resource file according to an embodiment of the present invention.

Each control 208 in the MyForm form 206 is mapped to a corresponding resource in the MyProject.resources resource file 212 as shown in FIG. 3. The MyProject.resources file 212 does not have to be located in the same folder as the assembly 100, because the locations of the file resources are read from the registry 108 based on the culture information 106. For example, the resources for the MyProject assembly 100 may be found in a file named myproject.fr.resources if the operating system on which the assembly 100 is running is in the French language. Similarly, the resources for the MyProject assembly 100 may be found in a file named myproject.de.resources if the operating system on which the assembly 100 is running is in the German language. When the culture information 106 informs the NewResourceManager class 102 that the operating system is in the French language, the resource file selected is myproject.fr.resources. The resource file name is automatically generated by inserting the ".fr" extension into the file name. To translate the string resources in all of the controls in the assembly 100 from French to German, only the resource text file corresponding to myproject.fr.resources needs to be provided to the French-German translator who translates each string accordingly. The assembly 100 does not need to be recompiled in order for the text strings displayed on the MyForm form 206 to appear in the German language instead of the French language. Only the German version of the text file corresponding to the French resource text file needs to be compiled into a corresponding resource file, such as myproject.de.resources and saved in the resource folder containing German-language resources. When the assembly 100 is run on a German operating system, the assembly 100 will automatically pull the resources from the myproject.de.resources file without any modification to the source code of the assembly 100.

The mapping scheme shown in FIG. 3 allows the NewWinForm base class 204 to extract the appropriate string resource for each control 208 by reading from the MyProject.resources resource file 212.

Figure 4:
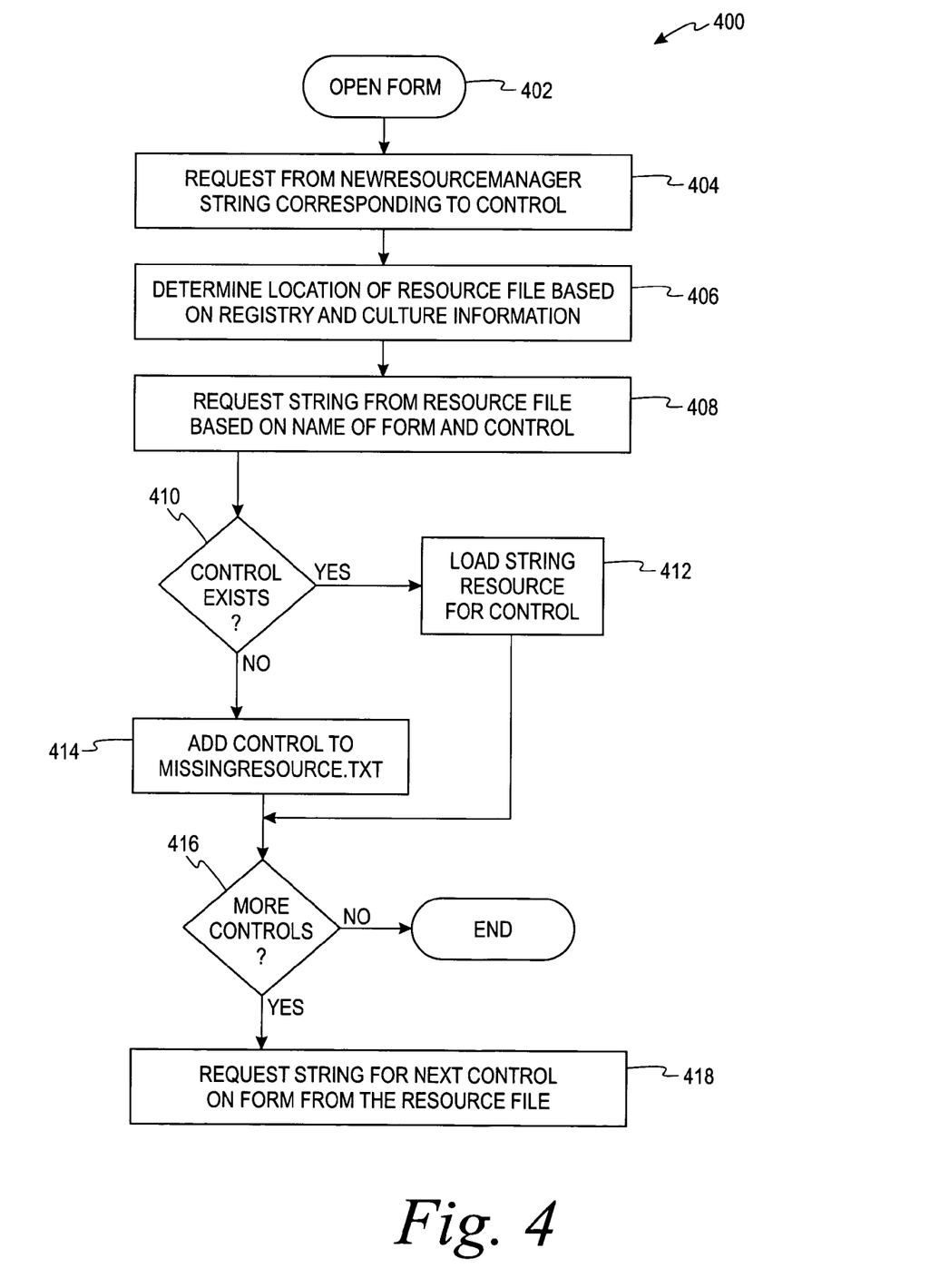
FIG. 4 is a flow chart diagram of a globalization method in accordance with an embodiment of the present invention.

FIG. 4 is a flow chart diagram of a method of identifying missing string resources from a resource file (400). The assembly 100 opens a form with the NewWinForm class 204 (402), which inherits the standard .NET framework form class. The NewWinForm class 204 examines each control on the form to determine whether the control has a text component (for example, a text box will include a text component that has a value or text string associated with it). For each such control, the NewWinForm class 204 requests from the NewResourceManager class 102 a string resource corresponding to a first control on the form in question (404). The NewResourceManager class 102 determines the location of the resource file that includes the first control and its associated string resource based on the resource folder information stored in the registry 108 and the culture information 106 (406). The NewResourceManager class 102 requests the string resource from the located resource file. If the control exists in the resource file (410), the string resource for that control is loaded (412) and the assembly 100 proceeds to the next control (416).

If the control in question does not exist in the located resource file (i.e., the control is missing) (410) or if no corresponding string resource is found for the control (i.e., the control is orphaned), the NewWinForm class 204 adds the name of the missing or orphaned control (along with its associated form name) to a text file, such as missingresource.txt. For example, in FIG. 2, there is no string resource or value associated with the control myform.textbox1.text, and therefore, the name of that control would be added to missingresource.txt. The software developer can quickly determine from viewing the missingresource.txt file all of the orphaned controls that do not have any string resources (values) associated with them.

In the case of a new translation, when the assembly 100 is executed on an operating system in a new human language, for example, Swedish, then all of the controls for the form in question will be listed on the missingresource.txt file because the NewResourceManager class 102 will not find any localized resource file for the controls on that form and will default to a standard-language resource file, such as English. The translator can be provided this missingresource.txt file and can populate the missing controls with the appropriate string resources in the target human language—in this example Swedish. All this can be done without having to recompile the assembly 100 or provide any binary assembly files to the translator. After the translator provides all the missing string resources in the target human language, the software developer simply names the text file appropriately and converts it to a resource file using a resource generator application such as resgen.exe. During install, the "Swedish" resource file(s) would be saved in the folder that is specified in the registry 108.

If there are more controls on the form in question to be iterated through (416), the NewWinForm class 204 requests the string resource for the next control on the form from the NewResourceManager class 102, which in turn requests the string resource from the appropriate resource file in the appropriate resource folder based on the resource folder information in the registry 108 and the human language ID in the culture information 106 (418).

The software developer can open the MissingResource.txt file and quickly determine which string resources are missing. The MissingResource.txt file also provides instant notification to the software developer of embedded strings within a project, which decreases localization bugs when, for example, testing the assembly 100 for different human languages. No longer does the software developer have to write separate code to pull strings from a resource file, an endeavor that was compounded for user-interface components that had complex layouts and required many resources. With the present invention, controls on a form are automatically populated with the appropriate text strings that can be located in any folder, and any missing controls are automatically added to a text file that logs the name of the control.

For example, if a resource file has been generated for the English language only, and it is desired for the assembly 100 to run on a French operating system, only a French-language resource file needs to be developed; no recompiling of the assembly 100 would be necessary. When the assembly 100 is run on a French operating system, the NewResourceManager 102 will not open the proper resource file because the culture information (French) will direct the NewResourceManager 102 to look for a filename comprising the French extension (.fr, for example), which will not exist. A missing resource text file will be created (such as MissingResource.txt discussed in connection with FIG. 4) that will include all of the controls on any given form. This missing resource text file can be provided to a translator, for example, who simply adds the values (text strings) for each control in the French language. The present invention ensures that no controls will be overlooked or mistyped during the translation process, because they will be automatically populated in a text file created by the assembly 100. Optionally, the English-language values (text strings) corresponding to each control may be included in the missing resource text file, and the translator would translate the English-language values into corresponding French-language values.

The French-language resource text file is converted into a resource file using a resource generator, and then it is saved in a folder whose location information is saved to the registry 108. When the assembly 100 is now run on a French operating system, the same assembly 100 without any modifications to its source code will automatically pull the resources from the French-language resource file (such as Assembly Resource File B 112) as opposed to the English-language resource file (such as Assembly Resource File A 110).

Figure 5:
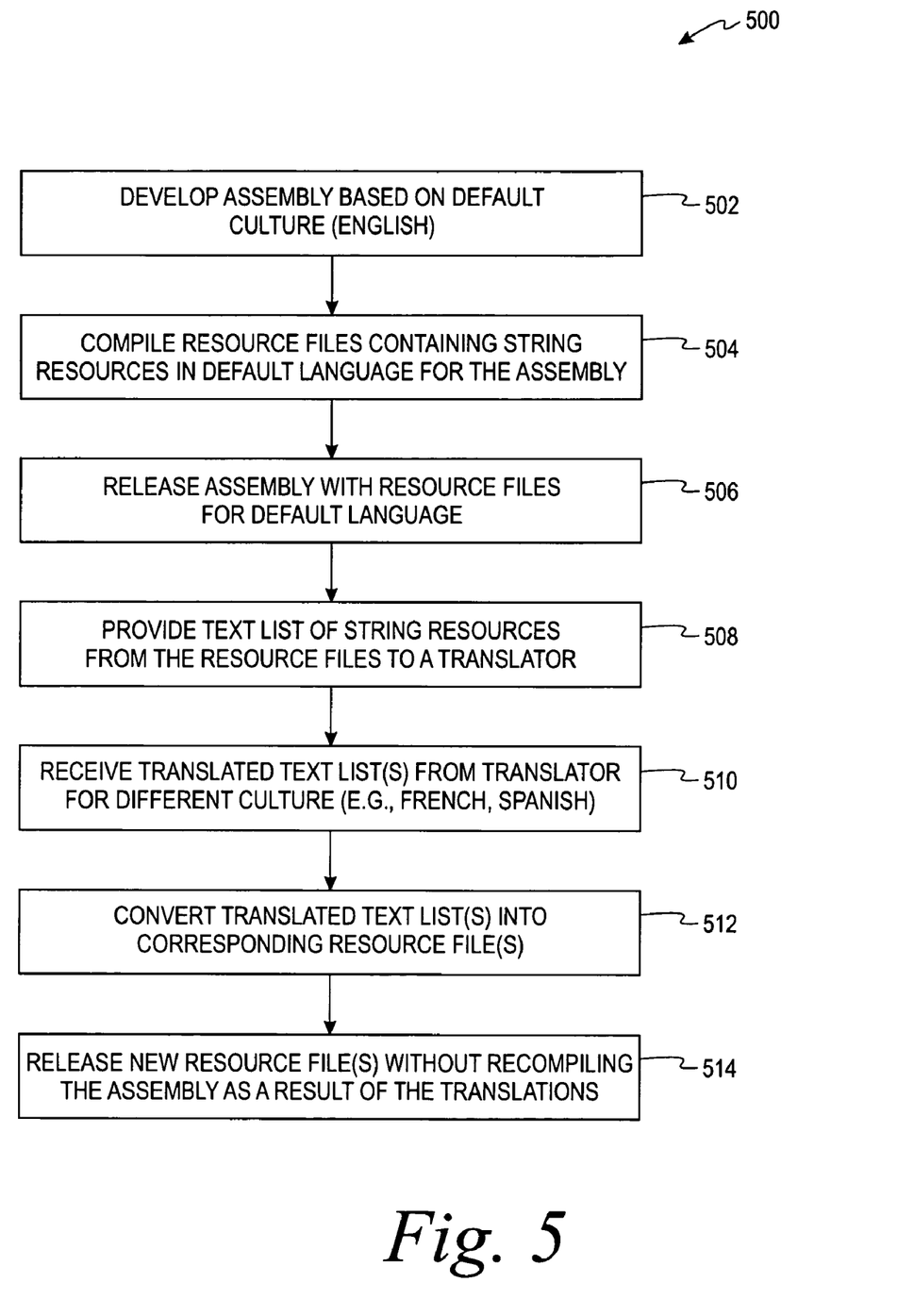
FIG. 5 is a flow chart diagram of a globalization method in accordance with another embodiment of the present invention.

FIG. 5 is a flow chart of a globalization method (500) of releasing an assembly in multiple languages without having to recompile the assembly as a result of translations into the target languages. As used herein, an assembly may include one or multiple assemblies (such as one or more process assemblies and one or more DLLs). The assembly 100 is developed based on a default culture (502), such as English. The assembly 100 is programmed using the NewResourceManager class 102 and the NewWinForm class 204. Each form in the assembly 100 is based on the NewWinForm class 204. Resources that populate the controls on the forms in the assembly 100 are returned (if located) by the NewResourceManager class 102 in response to requests from the NewWinForm class 204 for the requested resources.

The resource file(s) 110, 112 for the assembly 100 are compiled from text files that include the string resources in the default language (English) for the assembly 100 (504). The assembly 100 together with the resource file(s) 110, 112 are released for the default language (English) (506). A text list (generated by the NewWinForm class 204) of string resources from the resource files is provided to one or more translators (508). The text list includes a list of the names of the forms along with the names of their associated controls for which a resource value is missing for the target culture language. No binaries need to be provided to the translators.

After the text lists have been translated, they are received for one or more different cultures, such as for example, French and Spanish (510). The translated text list(s) are converted into corresponding resource file(s) (512) by a resource generator such as resgen.exe. The new resource file(s) 114 are released without recompiling the assembly 100 as a result of the translations (514) and without releasing any new or modified configuration files for the assembly 100. This means that the assembly 100 may be recompiled for other reasons before being released, but not by reason of the translations of the string resources from one culture to another. In other words, the translations do not necessitate any recompiling of the assembly 100; only the new resource files need to be compiled from the translated text files containing the string resources in the target human language. In this manner, any software application according to the present invention can be readily globalized into any human language, even after release in a first set of human languages, without requiring any recompiling of the assembly 100.

In another embodiment, the assembly 100 is released for all cultures after all resources files have been translated into the target human languages. Development of resources for a new culture, however, does not necessitate any recompiling of the assembly 100 in accordance with the present invention. The new resource files can be created independently of the assembly 100 without modifying any source code in the assembly 100.

The embodiments of the present invention can be applied to any assembly that requires its string resources to be translated into multiple languages. In particular, embodiments of the present invention are applied to assemblies for use in monitoring systems that monitor measurable quantities of a utility, including water, air, gas, energy, steam (collectively abbreviated as WAGES), and weather. For example, embodiments of the present invention can be applied to the PowerLogic® System Manager Software™, Billing Module, Interactive Graphics Module, PCS Powerlink G3 Software, or Active Pager Module commercially available from Square D Company. These software applications and modules are very complex and benefit greatly from the aspects of the present invention described herein.

While particular embodiments and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

What is claimed is:

1. A method of decoupling resource files from an assembly, comprising:
   providing an assembly that is executable by a computer, the assembly including forms having associated resources, the forms being defined by a form class, the resources being managed by a resource manager class; and
   defining a resource manager class that:
      obtains culture information indicating a human language of an operating system running on the computer,
      reads, by the computer, resource folder information from a registry external to the assembly, the resource folder information indicating a location of at least one resource file, and
      searches, by the computer, the resource folder for a culture-specific resource file having a filename based on the culture information.

2. The method of claim 1, further comprising:
   defining a form class that:
      for at least some controls on a form, requests from the resource manager class a resource associated with each of the at least some controls, and
      if the resource manager class returns an indication that the control or the associated resource does not exist, adds the name of the missing control and the name of its associated form to a file; and
      determining, from the resource manager class, whether the requested control exists in the resource file.

3. The method of claim 2, wherein the computer is coupled to a monitoring system that monitors measurable quantities of a utility.

4. The method of claim 3, wherein the utility is selected from the group consisting of water, air, gas, energy, steam, and weather.

5. The method of claim 4, wherein the monitoring system is a power monitoring system.

6. The method of claim 2, further comprising:
   creating a new resource file having text strings in a different human language from the text strings in the at least one resource file; and
   reading automatically from the assembly the new resource file without recompiling the assembly to read the new resource file or without creating or modifying any configuration files.

7. The method of claim 2, wherein the file is a text file, the method further comprising converting the text file to a resource file.

8. A computer readable storage medium encoded with instructions for directing a controller to perform the method of claim 1.

9. The method of claim 1, wherein the assembly is developed in accordance with the .NET framework.

10. The method of claim 9, wherein the form class inherits from the standard form class provided by the .NET framework.

11. The method of claim 9, wherein the resource manager class further creates an instance of the standard resource manager provided by the .NET framework.

12. The method of claim 9, wherein the defining the resource manager class further includes creating an instance of a default resource manager within the .NET framework, the method further comprising:
    defining a globalization form class within the .NET framework, which:
       identifies at least some controls on a form having a name,
       determines whether each of the at least some controls includes a text component,
       if the control of the at least some controls includes a text component, for each such control, requests from the resource manager class the value corresponding to text component associated with such control, and
       stores the name of the form and the name of such control in a text file when the globalization resource manager class returns no value responsive to the request by the form class, wherein the globalization form class inherits from the default form class in the .NET framework.

13. The method of claim 12, further comprising:
    creating a new resource file having text strings, for the at least some controls that include a text component, the text strings being in a different human language from the human language of the culture information; and
    reading, from the assembly, the text strings in the new resource file without recompiling the assembly as a result of the new resource file or without creating or modifying any configuration files.

14. The method of claim 12, further comprising storing in the registry the location of the folder that includes the resource file.

15. The method of claim 12, further comprising translating the values corresponding to the text components associated with each of the at least some controls into a human language different from the human language of the culture information without recompiling the assembly as a result of the translation.

16. The method of claim 1, wherein a change to the resources do not require any recompiling of the assembly.

17. The method of claim 1, wherein the operating system is a Windows-based operating system.

18. The method of claim 1, further comprising storing the at least one resource file in a folder different from the folder in which the assembly is stored.

* * * * *